United States Patent [19]

Clarke

[11] Patent Number: 4,638,351
[45] Date of Patent: Jan. 20, 1987

[54] ADAPTIVE FILTER FOR USE IN COLOR VIDEO SIGNAL PROCESSING

[75] Inventor: Christopher K. P. Clarke, Crawley, England

[73] Assignee: British Broadcasting Corporation, London, England

[21] Appl. No.: 533,766

[22] Filed: Sep. 19, 1983

[30] Foreign Application Priority Data

Sep. 20, 1982 [GB] United Kingdom ............... 8226798

[51] Int. Cl.⁴ .................................................. H04N 9/77
[52] U.S. Cl. ..................................... 358/38; 358/31; 358/39; 358/36
[58] Field of Search ................... 358/30, 31, 36, 38, 358/39

[56] References Cited

U.S. PATENT DOCUMENTS

| 4,090,221 | 5/1978 | Connor | 358/166 |
| 4,149,181 | 4/1979 | Byrdick et al. | 358/39 |
| 4,167,021 | 9/1979 | Holmes | 358/39 |
| 4,179,705 | 12/1979 | Faroudja | 358/31 |
| 4,194,219 | 3/1980 | Drewery | 358/167 |
| 4,219,842 | 8/1980 | Miller | 358/31 |
| 4,241,363 | 12/1980 | Maeyama et al. | 358/36 |
| 4,291,333 | 9/1981 | Warnock et al. | 358/36 |
| 4,361,853 | 11/1982 | Remy | 358/167 |
| 4,389,665 | 6/1983 | Nagao et al. | 358/31 |

FOREIGN PATENT DOCUMENTS

| 2821183 | 8/1979 | Fed. Rep. of Germany | 358/37 |
| 2387557 | 11/1978 | France . | |
| 0123280 | 9/1980 | Japan | 358/31 |
| 31287 | 2/1982 | Japan | 358/31 |
| 1402609 | 8/1975 | United Kingdom . | |
| 2010046 | 6/1979 | United Kingdom . | |
| 2035745 | 6/1980 | United Kingdom | 358/31 |
| 2078054 | 12/1981 | United Kingdom | 358/31 |

Primary Examiner—John W. Shepperd
Attorney, Agent, or Firm—Robert F. O'Connell

[57] ABSTRACT

A filter is disclosed for adaptively filtering a PAL or NTSC luminance signal so as to attenuate the high frequency portion of the luminance band, wherein the chrominance information lies, when movement is detected. This reduces cross-color in the reproduced picture. Movement is detected by comparing the undelayed luminance signal with this signal delayed by an integral number of lines corresponding substantially to one field or one picture. The filter may precede a coder or follow a decoder.

9 Claims, 3 Drawing Figures

ADAPTIVE FILTER FOR USE IN COLOR VIDEO SIGNAL PROCESSING

FIELD OF THE INVENTION

This invention relates to a filter for the adaptive filtering of the luminance component of a colour video signal of the type in which chrominance information is carried in an encoded signal in the upper portion of the luminance band, e.g. a PAL or NTSC signal. The filter is particularly suitable for use in conjunction with a PAL or NTSC coder or decoder.

The high frequency luminance components of a composite NTSC or PAL video signal which represents a moving scene are generally misinterpreted in the decoder as stationary or slowly moving colours.

THE INVENTION

The invention is based upon the possibility of improving the subjective picture quality by removing the objectionable components before encoding in the encoder, or after decoding in the decoder. Although the resulting loss of detail may be noticeable, this is likely to be a less subjectively-noticeable impairment than the cross-colour which would otherwise be produced.

The present invention provides an improved filter for filtering the luminance component of a video signal such as a PAL or NTSC signal. The filter characteristics are dynamically variable in response to movement in the video scene content. More specifically the signals in the upper portion of the luminance band, namely that portion into which the chrominance information is also fitted, is attenuated relative to the lower portion of the band when movement is detected.

One way of removing the high frequency luminance components would be to use a linear temporal comb filter. However, the onset of luminance removal would be relatively slow unless a large number of picture delays were used. Preferably therefore the filter detects movement by subtracting across a one-picture or substantially one-field delay, the resultant of the subtraction being formed into a control signal to reduce the amount of high frequencies in the signal in the presence of movement.

BRIEF DESCRIPTION OF THE DRAWINGS

The invention will be described in more detail, by way of example, with reference to the drawing, in which.

Figure 1:
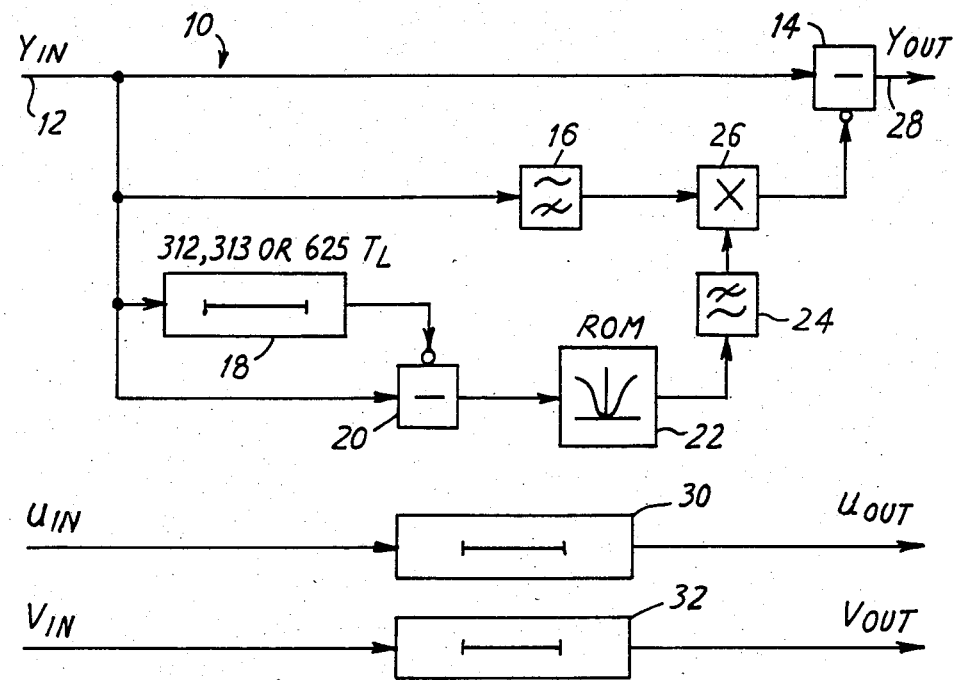
FIG. 1 is a block circuit diagram of a filter embodying the invention.

The luminance filter 10 shown in FIG. 1 specifically for use with PAL colour signals has a luminance input 12. To this are connected a subtractor 14, a high pass filter 16 which selects luminance components in the region occupied by the chrominance band in the encoded signal, a delay 18 which in a 625 line system may be 312, 313 or 625 lines long, and a subtractor 20. In a 525 line NTSC system the delay may be 262, 263 or 525 lines long. The subtractor 20 has its inverting input connected to the output of the field or picture delay 18 and thus subtracts signals one field or picture apart to give a rough indication of movement in the scene content. The subtractor output is applied to a read only memory (ROM) 22 which applies a non-linear function to the subtractor output. The ROM in fact serves to rectify the subtractor output and to provide a smaller gain to low amplitude signals and a higher gain for larger amplitude signals. This provides a degree of protection against the effects of noise in the signal. The resultant signal is preferably low-pass filtered in a filter 24 to remove harmonic components introduced by the non-linear process.

A multiplier 26 is connected to multiply the output of the high-pass filter 16 by the output of the low pass filter 24. The multiplied output is applied to the inverting input of subtractor 14. In this way a controlled proportion of the high frequency components is subtracted from the input signal to form the luminance signal at the output 28, the control signal being representative of the amount of movement in the scene represented by the video signal.

Compensating delays 30, 32 should be included in the U and V (or I and Q) chrominance signal paths. Compensating delays may also be required in the luminance filter, e.g. in the input feed to the high-pass filter 16 and subtractor 14, but are not shown.

Figure 2:
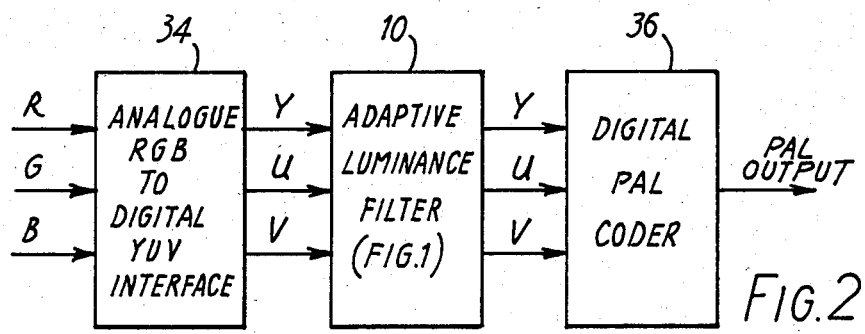
FIGS. 2 and 3 are schematic diagrams illustrating the use of the filter of FIG. 1 in conjunction with an encoder and a decoder respectively.

FIG. 2 illustrates the use of the circuit 10 in a PAL encoder. The R, G and B signals are applied to digitising and matrix circuitry 34 which produces Y, U and V signals. These are applied through the filter 10 to any suitable digital PAL coder 36.

Figure 3:
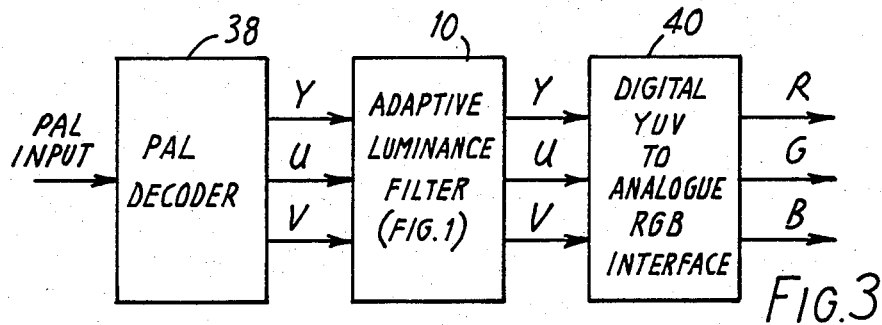

FIG. 3 similarly illustrates a decoder. Here a PAL decoder 38 supplies Y, U and V signals through the filter 10 to circuitry 40 providing the functions of a digital-to-analogue converter and a matrix. In this case the filter detects and removes any cross-luminance (i.e. residual subcarrier) components left in the output of the PAL decoder. This is possible because, in general, these components produce a moving high-frequency pattern in the picture. The removal of these components is particularly desirable if the signals are subsequently to be recorded to PAL, as this avoids components from the two coding operations beating with one another.

The filter 10 illustrated is particularly suitable for use in decoders of the type described in UK Patent Application Nos. 2078054A and 20666615A. While the description and drawings are illustrative of application to PAL signals, the invention is equally applicable to NTSC signals.

What is claimed is:

1. A filter arrangement for filtering the luminance component of a colour video signal in which chrominance information is carried, in an encoded signal, in the upper portion of the luminance band, said filter arrangement comprising an input for receiving a colour video luminance signal;

means being connected to said input and receiving the full bandwidth luminance signal for detecting movement in the scene content between successive frames of said video signal to produce a control signal; and a filter connected to said input and the transmission characteristic of which in the said upper portion of said luminance band is dynamically variable, said filter being adapted to receive said control signal when movement is detected so as to vary the filter transmission dynamically so as to attenuate the luminance signals in said upper portion relative to the signals in the remainder of said band.

2. A filter arrangement according to claim 1, wherein said movement detecting means comprises means providing a luminance delay of substantially one picture or field, and means for forming the difference between the delayed and undelayed luminance signals.

3. A filter arrangement according to claim 2, including processing means for operating on said difference signal to rectify it to produce said control signal.

4. A filter arrangement according to claim 3, wherein said processing means reduce low-amplitude difference signals relative to high-amplitude difference signals.

5. A filter arrangement according to claim 3, wherein said processing means comprise a read-only memory.

6. A filter arrangement according to claim 1, wherein said attenuation of said luminance signals is variable over a range in dependence upon the magnitude of said control signal whereby said luminance signals in said upper portion of said luminance band are subjected to a controlled degree of attenuation.

7. A filter arrangement according to claim 6, wherein said filter comprises a bandpass filter element connected to the input for passing signals in said upper portion only of the luminance band, means for multiplying the output of said filter element by said control signal, and means for subtracting the resultant signal from the luminance signal.

8. A decoding arrangement operative on a composite colour signal to provide a luminance signal and chrominance signals extracted from an upper portion of the luminance band, and an adaptive luminance filter provided with means receiving the full-bandwidth luminance signal for detecting movement between successive frames of said video signal, said filter being operative on said luminance signal to attenuate said signal in said upper portion of the luminance band in response to detected movement in the scene content of said luminance signal.

9. An encoding arrangement for colour television luminance and chrominance signals comprising a coder operative on said signals to produce a composite signal having chrominance information in an upper portion of the luminance band, and an adaptive luminance filter upstream of said coder provided with means receiving the full-bandwidth luminance signal for detecting movement between successive frames of said video signal, said filter being operative on said luminance signal to attenuate luminance components in said upper portion of the luminance band in response to detected movement in the scene content of the luminance signal.

* * * * *